United States Patent [19]

Flynn

[11] Patent Number: 5,722,196
[45] Date of Patent: Mar. 3, 1998

[54] AQUATIC SEINE DEVICE

[75] Inventor: Robert E. Flynn, Twin Bridges, Mont.

[73] Assignee: Manufacturing Technologies, Inc., Sheridan, Mont.

[21] Appl. No.: 538,240

[22] Filed: Oct. 3, 1995

[51] Int. Cl.$^6$ ........................................ A01K 73/12
[52] U.S. Cl. ........................... 43/14; 43/9.1; 43/9.4
[58] Field of Search ........................ 43/9.1, 9.4, 9.7, 43/14, 104, 55

[56] References Cited

U.S. PATENT DOCUMENTS

| | | | |
|---|---|---|---|
| 1,480,192 | 1/1924 | Worsfold | 43/9.1 |
| 1,723,236 | 8/1929 | Hansen | 43/9.7 |
| 1,959,793 | 5/1934 | Lafredo | 43/9.1 |
| 2,300,178 | 10/1942 | Ross | 43/9.4 |
| 2,414,055 | 1/1947 | Miller | 43/9.1 |
| 2,985,974 | 5/1961 | Worcester | 43/9.1 |
| 3,608,217 | 9/1971 | Voisin | 43/9.4 |

FOREIGN PATENT DOCUMENTS

| | | | |
|---|---|---|---|
| 1080804 | 3/1984 | U.S.S.R. | 43/9.4 |

Primary Examiner—Kurt Rowan

[57] ABSTRACT

An aquatic sampling device is provided, said aquatic sampling device comprising generally a plurality of two parallel vertical members, a plurality of two parallel horizontal members, a plurality of two support cross members, and a flexible net. Said plurality of two parallel vertical members being pivotally and slidably attached to said plurality of two parallel horizontal members by means of a plurality of two pins on said plurality of two parallel horizontal members extending through a plurality of two slots in said plurality of two vertical members. Said plurality of two parallel vertical members pivoting from resting horizontally against said plurality of two parallel horizontal members to 90 degrees or perpendicular to said plurality of two parallel horizontal members. Said plurality of two parallel vertical members being further attached to said plurality of two parallel vertical members by a plurality of two flexible cords. Said aquatic seine device further having a plurality of two support cross members, said plurality of two support cross members each pivotally attaching to one of said plurality of two parallel horizontal members and each removably attaching to the other of said plurality of two parallel horizontal members. Said aquatic seine device further having a flexible net, said flexible net having at least two vertical compartments, and being capable of allowing running water to pass therethrough yet retaining aquatic insects, nymphs or other organisms being carried both on the surface and below the surface by said running water passing through said flexible net.

2 Claims, 3 Drawing Sheets

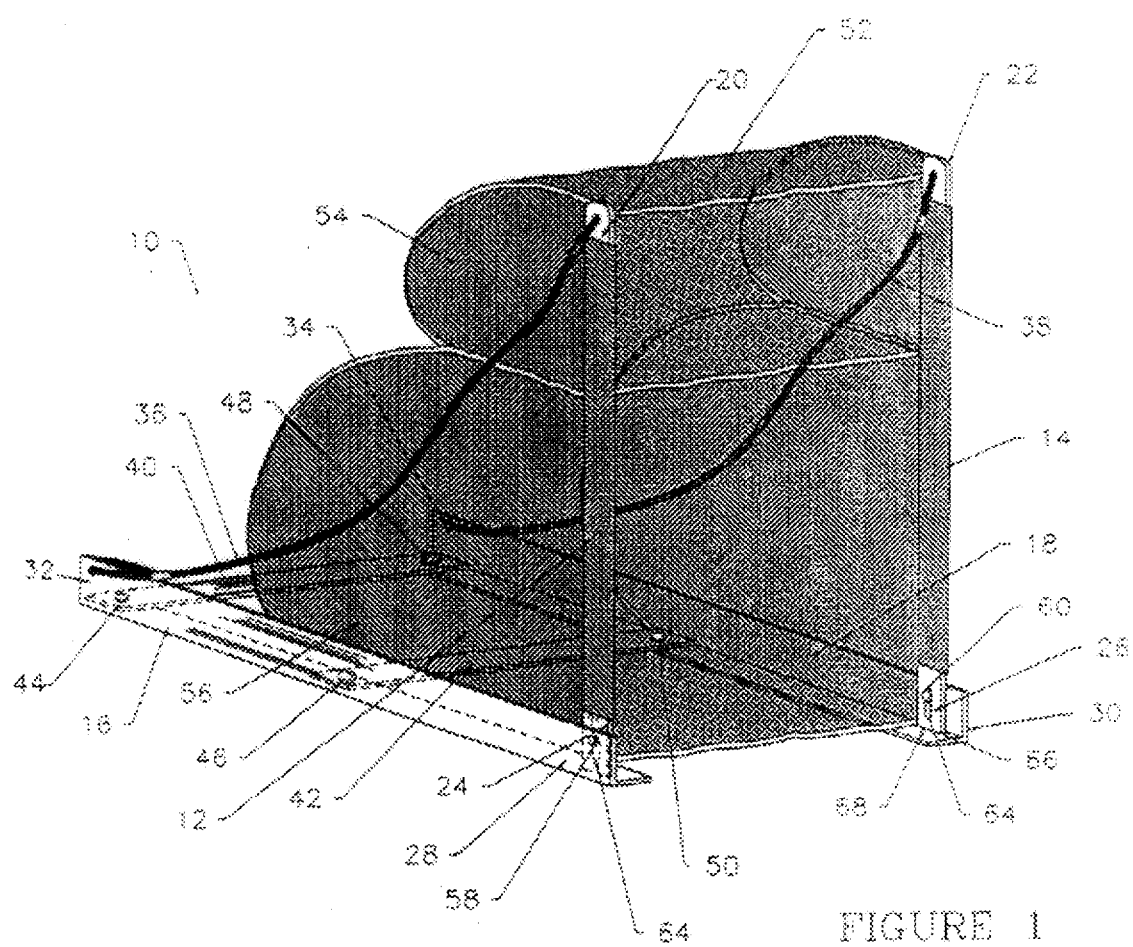
FIGURE 1
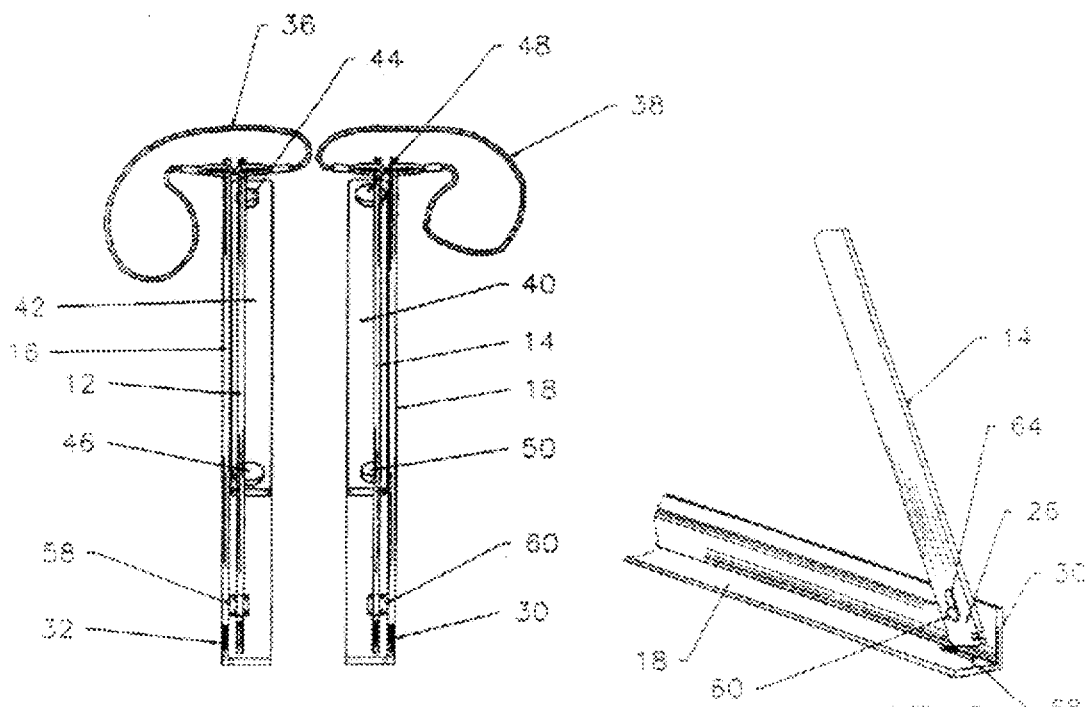
FIGURE 2
FIGURE 3

AQUATIC SEINE DEVICE

BACKGROUND OF THE INVENTION

1. Field of Invention

The present invention relates to aquatic seine devices and more particularly to an aquatic seine device adapted to be utilized for trapping insects, nymphs and other organisms being carried by running water and which can be placed in running water in a self-supporting manner.

2. Description of Possible Prior Art

In the past, there have been various devices used for underwater sampling or collecting of specimens. Known is U.S. Pat. No. 4,745,703 wherein a seine net device is described. Said seine net device being particularly adapted for collection of minnows. Said seine net device having a collapsible tripod-like frame consisting of three poles joined by an adjustable connecting structure permitting the tripod to be folded into a handy easy carry form. Said seine net device further having a seine net which is attached to and spread between the forward two legs of the tripod, said seine net further having floats attached to the upper portion thereof and sinkers attached to the lower portion thereof.

Known is U.S. Pat. No. 4,446,749 wherein an aquatic specimen retrieval frame is described. Said aquatic specimen retrieval frame having a pair of collection nets, the open end of each being held by a hoop. Said two hoops bring hinged together and closed in an abutting concentric relation in the pre-sampling condition, and the whole being connected to a tow line. When released, the flow of water past the hoops causes them to unhinge into a side by side position so that water is directed through the hoops and into the nets.

Known is U.S. Pat. No. 3,699,700 wherein minnow seine poles are described, said minnow seine poles having a seine net spread between two spaced parallel poles whose rearward ends provide appropriate handles. The marginal side portions of said net are provided with an attached line which is releasably connected to said poles by resilient adapter clips.

SUMMARY OF THE INVENTION

1. Brief Description of the Invention

Persons knowledgeable with the art to which the present invention relates are aware that a need exists for a portable, lightweight, easily assembled and disassembled aquatic seine device for sampling insects, nymphs and other organisms in running water such as streams or rivers. Such a portable, lightweight, easily assembled and disassembled aquatic seine device is of particular interest to fishermen and especially flyfishermen who present attractants to fish based upon insects, nymphs and other organisms in running water, both on the surface and below the surface of the running water. Needed is a portable, lightweight, easily assembled and disassembled aquatic seine device which is capable of self-support in running water, which passively collects samples from the running water, both on the surface and below the surface, and which allows the individual fisherman to minimally disturb the bed of the running water upstream of the device without necessarily attending the device if so desired. Needed is a portable, lightweight, easily assembled and disassembled aquatic seine device which would allow a fisherman to sample the water to be fished, both on the surface and below the surface for insects, nymphs and other organisms, while said fisherman is assembling fishing gear and determining the attractants to be used in fishing such water. Determining the attractants to be used in fishing such water is generally based upon the insects, nymphs and other organisms in such water.

The present invention fills such need by providing an aquatic sampling device comprising generally a plurality of two parallel vertical members, a plurality of two parallel horizontal members, a plurality of two support cross members, and a flexible net. Said plurality of two parallel vertical members being pivotally and slidably attached to said plurality of two parallel horizontal members by means of a plurality of two pins on said plurality of two parallel horizontal members extending through a plurality of two slots in said plurality of two vertical members. Said plurality of two parallel vertical members pivoting from resting horizontally against said plurality of two parallel horizontal members to 90 degrees or perpendicular to said plurality of two parallel horizontal members. Said plurality of two parallel vertical members being further attached to said plurality of two parallel vertical members by a plurality of two flexible cords, said plurality of two flexible cords being used as handles for moving and positioning the assembled aquatic seine device when assembled.

Said aquatic seine device further having a plurality of two support cross members, said plurality of two support cross members each pivotally attaching to one of said plurality of two parallel horizontal members and each removably attaching to the other of said plurality of two parallel horizontal members. Said aquatic seine device further having a flexible net, said flexible net being capable of allowing running water to pass therethrough yet retaining aquatic insects, nymphs or other organisms being carried both on the surface and below the surface by said running water passing through said flexible net.

2. The Object of the Invention

A principal object of the present invention is to provide an aquatic seine device which is portable, lightweight, easily assembled and disassembled for sampling insects, nymphs and other organisms both on the surface and below the surface of running water such as streams or rivers.

A further object of the present invention is to provide an aquatic seine device which is minimally intrusive to the environment in which said aquatic seine device is used.

A further object of the present invention is to provide an aquatic seine device which is self-supporting.

A further object of the present invention is to provide an aquatic seine device which is easily transported and stored.

A further object of the present invention is to provide an aquatic seine device which is easily utilized by an individual fisherman or other desiring to sample running water.

The present invention is new, useful and unique and is a vast improvement over related devices by virtue of its inherent relative simplicity and inherent economy of manufacture and maintenance.

To the accomplishment of the above and related objects, the present invention may be embodied in the arrangement, combination and details of construction illustrated in the accompanying drawings and specification, attention being called to the fact, however, that the drawings are illustrative only, and that changes may be made in the specific construction illustrated and described within the scope of the appended claims.

IN THE DRAWINGS

FIG. 1 is a three dimensional view of the present invention shown assembled.

FIG. 2 is a perspective view of the present invention shown disassembled with the flexible net removed.

FIG. 3 is a perspective view of the present invention showing an L-shaped horizontal member pivotally attaching to a vertical member.

DESCRIPTION OF THE PREFERRED EMBODIMENT

Figure 4:
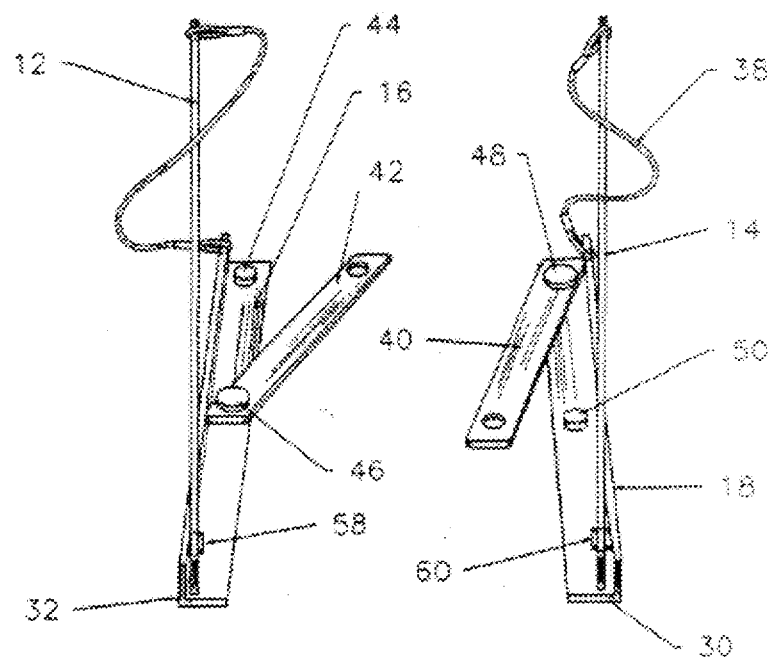
FIG. 4 is a perspective view of the present invention showing the L-shaped horizontal members, the vertical members and the support cross members.
Figure 5:
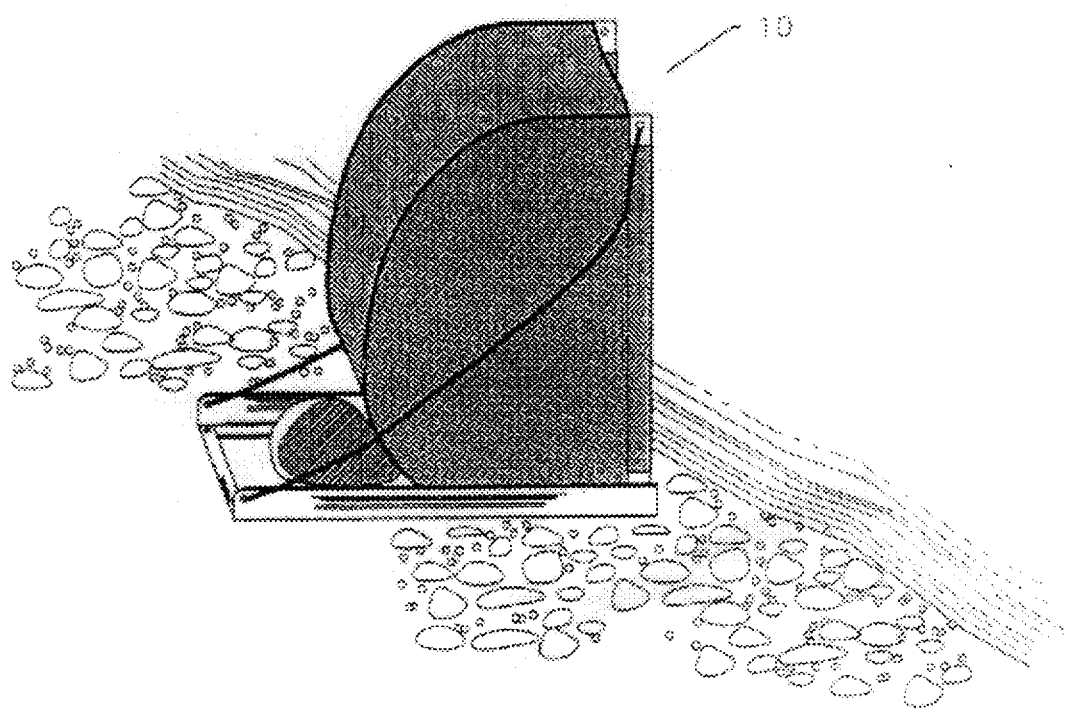
FIG. 5 is a three dimensional view of one embodiment of the present invention assembled showing the flexible net having one compartment.
Figure 6:
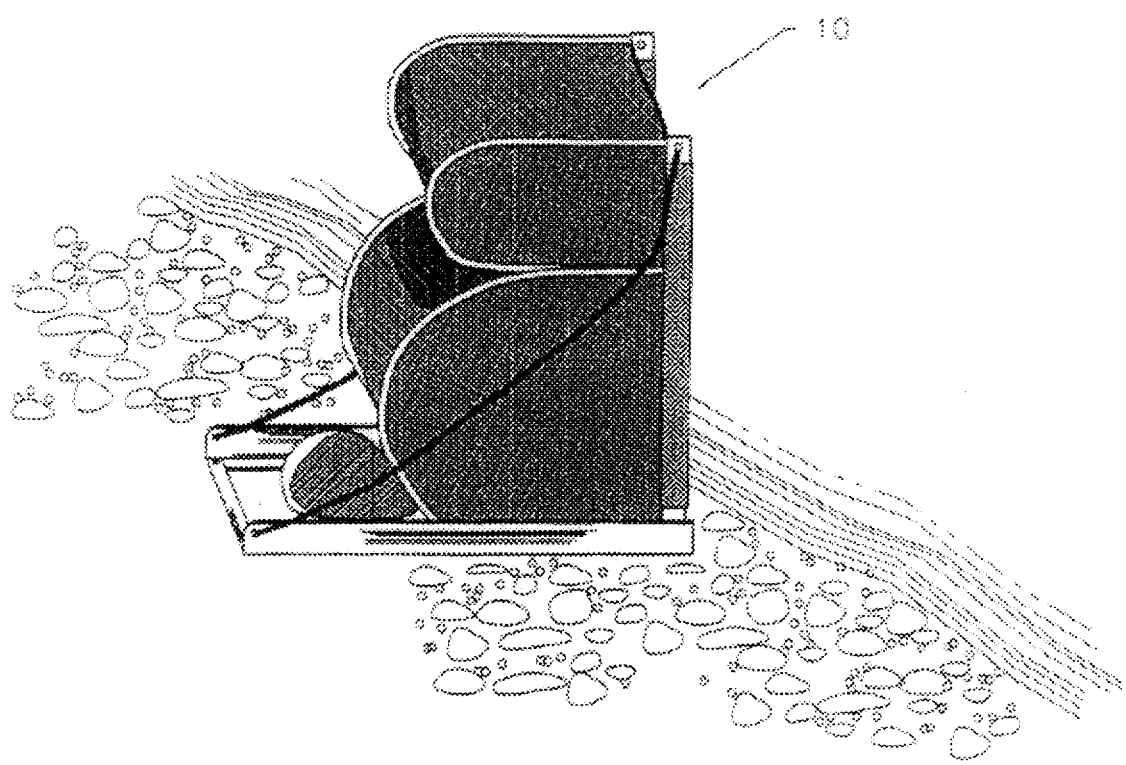
FIG. 6 is a three dimensional view of one embodiment of the present invention assembled showing the flexible net having two compartments.
Figure 7:
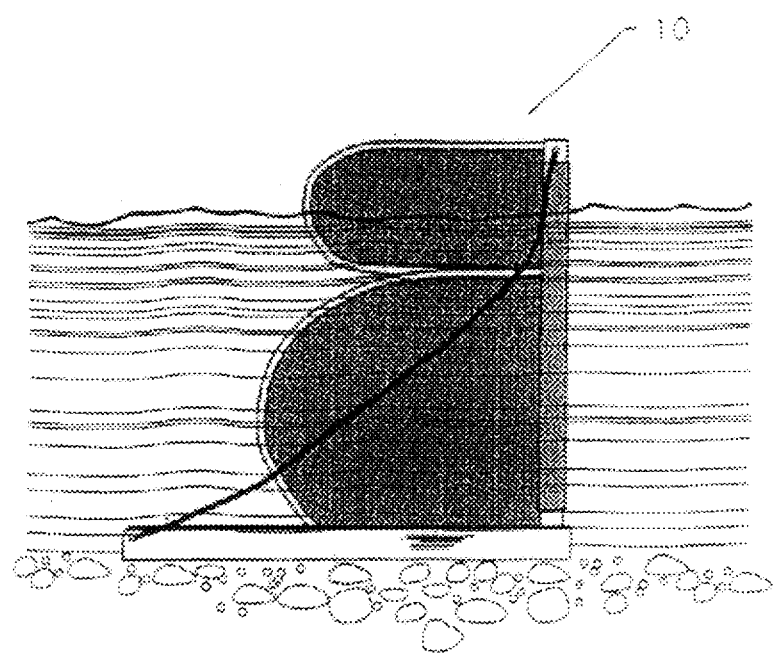
FIG. 7 is a three dimensional view of the present invention showing the aquatic seine device within a stream or other body of water.

Turning now descriptively to the drawings, in which similar reference characters denote similar elements throughout, the several views, FIG. 1 shows generally an aquatic seine device 10 of the present invention having a plurality of two parallel vertical members 12 and 14, a plurality of two parallel horizontal members 16 and 18, a plurality of two flexible cords 36 and 38, a plurality of two support cross members 40 and 42, and a flexible net 52.

FIG. 2 shows said plurality of two parallel vertical members 12 and 14 being pivotally attached to said plurality of two parallel horizontal members 16 and 18. Said plurality of two parallel vertical members 12 and 14 each having a top end 20 and 22 and a bottom end 24 and 26. Said plurality of two parallel horizontal members 16 and 18 being L-shaped and each having a front end 28 and 30 and a rear end 32 and 34. Said bottom ends 24 and 26 of said plurality of two parallel vertical members 12 and 14 one each being pivotally and slidably attached to the vertical portion of the L-shape of one each of said front ends 28 and 30 of said plurality of two parallel L-shaped horizontal members 16 and 18 by means of a plurality of two pins 58 and 60 on the vertical portion of said front ends 28 and 30 of said plurality of two parallel L-shaped horizontal members 16 and 18 extending through a plurality of two slots 62 and 64 on said bottom ends 24 and 26 of said plurality of two vertical members 12 and 14.

FIG. 3 shows said plurality of two parallel vertical members 12 and 14 pivoting on said plurality of two pins 58 and 60 on said front ends 28 and 30 of said plurality of two parallel L-shaped horizontal members 16 and 18 to 90 degrees or perpendicular to said plurality of two parallel L-shaped horizontal members 16 and 18. Said plurality of two parallel L-shaped horizontal members 16 and 18 each have one of a plurality of two slots 66 and 68 in the horizontal portion of the L-shape of said front ends 28 and 30 of said plurality of two parallel L-shaped horizontal members 16 and 18. Said plurality of two slots 62 and 64 on said bottom ends 24 and 26 of said plurality of two vertical members 12 and 14 pivoting and sliding on said plurality of two pins 58 and 60 such that said bottom ends 24 and 26 of said plurality of two parallel vertical members 12 and 14 rest in said plurality of two slots 66 and 68 in said front ends 28 and 30 of said plurality of two parallel L-shaped horizontal members 16 and 18. Said bottom ends 24 and 26 of said plurality of two parallel vertical members 12 and 14 resting in said plurality of two slots 66 and 68 in said horizontal portion of the L-shape of said front ends 28 and 30 of said plurality of two parallel L-shaped horizontal members 16 and 18 securing said plurality of two parallel vertical members 12 and 14 90 degrees or perpendicular to said plurality of two parallel L-shaped horizontal members 16 and 18.

Said plurality of two parallel vertical members 12 and 14 being further attached to said plurality of two parallel L-shaped horizontal members 16 and 18 by a plurality of two flexible cords 36 and 38 extending therebetween, said plurality of two flexible cords 36 and 38 attaching to said top ends 20 and 22 of said plurality of two parallel vertical members 12 and 14 and to the vertical portion of said rear ends 32 and 34 of said plurality of two parallel L-shaped horizontal members 16 and 18. One flexible cord 36 of said plurality of two flexible cords 36 and 38 extending between said top end 20 of said parallel vertical member 12 and said rear end 32 of said parallel L-shaped horizontal member 16, and one flexible cord 38 of said plurality of two flexible cords 36 and 38 extending between said top end 22 of said parallel vertical member 14 and said rear end 34 of said parallel L-shaped horizontal member 18. Said plurality of two flexible cords 36 and 38 being used as handles for moving and positioning the assembled aquatic seine device 10.

Said aquatic seine device 10 further having a plurality of two support cross members 40 and 42, said plurality of two support cross members 40 and 42 each having a first end 44 and 46 and a second end 48 and 50. Said first ends 44 and 46 of said support cross members 40 and 42 each being pivotally attached to the horizontal portion of one of said plurality of two parallel L-shaped horizontal members 16 and 18. Said second ends 48 and 50 of said support cross members 40 and 42 each being releasably attachable to the horizontal portions of the other of said plurality of two parallel L-shaped horizontal members 16 and 18 such that when said plurality of two support cross members 40 and 42 are each pivotally positioned perpendicular to said parallel L-shaped horizontal member 16 or 18 to which said support cross members 40 and 42 are pivotally attached and releasably attached to said parallel L-shaped horizontal member 16 or 18 to which said support cross members 40 and 42 are releasably attached, said plurality of two support cross members 40 and 42 secure said plurality of two parallel L-shaped horizontal members 16 and 18 in a generally rectangular framework manner, said generally rectangular framework supporting said plurality of two parallel vertical members 12 and 14 in upright parallel position.

Said aquatic seine device further having a flexible net 52, said flexible net 52 being capable of allowing running water to pass therethrough yet retaining aquatic insects, nymphs or other organisms being carried by said running water, both on the surface and below the surface, passing through said flexible net 52. In one embodiment, said flexible net 52 having at least two compartments 54 and 56 vertically, said vertical compartments 54 and 56 being used to further segregate samples collected dependent upon the depth of water from the surface being sampled. In said embodiment having said two vertical compartments 54 and 56, said upper vertical compartment 54 of said flexible net 52 may be generally smaller in volume than said lower vertical compartment(s) 56 of said flexible net 52 and when being used, generally extending from below to above the surface of said running water to capture insects, nymphs or other organisms being carried on the surface of said running water. Said flexible net 52 further being adapted for being secured to said plurality of two parallel vertical members 12 and 14.

Said aquatic seine device is portable and easily stored and transported in a disassembled condition, said aquatic seine device requiring minimal space in said disassembled condition. In said disassembled condition, said flexible net 52 and said plurality of two parallel L-shaped horizontal members 16 and 18 each having one of said plurality of two parallel vertical members 12 and 14 and one of which having said plurality of two support cross members 40 and 42 are all disassembled from each other and conveniently packaged for storage or transport.

In operation, said aquatic seine device 10 is assembled and placed in running water to capture the aquatic nymphs, insects or other organisms being carried by said running water, both above surface and below surface of said running water. To assemble said aquatic seine device 10, said plurality of two parallel L-shaped horizontal members 16 and 18 each having one of said plurality of two parallel vertical members 12 and 14 pivotally attached are placed parallel to each other. Said plurality of two parallel vertical members 12 and 14 are each pivoted 90 degrees or approximately perpendicular to said plurality of two parallel L-shaped horizontal members 16 and 18 on said plurality of two pins 58 and 60 and secured in said perpendicular position by sliding said plurality of two bottom ends 24 and 26 of said plurality of two parallel vertical members 12 and 14 into said plurality of two slots 66 and 68 in said front ends 28 and 30 of said plurality of two parallel L-shaped horizontal members 16 and 18. Said plurality of two support cross members 40 and 42 are each pivoted 90 degrees or approximately perpendicular to said parallel L-shaped horizontal member 16 or 18 to which said plurality of two support cross members 40 and 42 are pivotally attached. Said plurality of two support cross members 40 and 42 are further releasably attached to said parallel L-shaped horizontal member 16 or 18 to which said plurality of two support cross members 40 and 42 releasably attach, thus assembling the framework to which said flexible net 52 is secured. Said flexible net 52 is secured to said plurality of two parallel vertical members 12 and 14.

Said assembled aquatic seine device 10 with said attached flexible net 52 is placed in said running water to be sampled by having said plurality of two parallel L-shaped horizontal members 16 and 18 with said attached flexible net 52 facing into said running water, said aquatic seine device 10 being moved and positioned by said plurality of two flexible cords being used as handles for moving and positioning the assembled aquatic seine device in said running water and said assembled aquatic seine device being secured in said running water by placement of a rock or other relatively heavy object on one or both of said support cross members 40 and/or 42. Said upper vertical compartment 54 of said flexible net 52 being generally positioned partially above the surface and partially below the surface of said running water for sampling insects, nymphs and other organisms on the surface of said running water. Said lower vertical compartment(s) 56 of said flexible net 52 being generally positioned from the bed of said running water up to the bottom of said upper vertical compartment 54 of said flexible net 52 for sampling insects, nymphs or other organisms below the surface of said running water. Upon completion of the sampling of said running water, said vertical compartments 54 and 56 of said flexible net 52 are examined to determine the insects, nymphs or other organisms present on or in said running water for presenting fishing attractants, and said aquatic seine device 10 is easily and quickly disassembled and stored.

It will be apparent that various modifications can be made in the aquatic seine device described above and shown in the drawings within the scope of the present invention. The size, configuration and arrangement of components can be different to meet specific requirements. These and other changes can be made in the aquatic seine device provided the functioning and operation thereof are not adversely affected. Therefore, the scope of the present invention is to be limited only by the following claims.

What is claimed is:

1. A portable aquatic seine device comprising:

a plurality of two parallel L-shaped horizontal members;

a plurality of two parallel vertical members, said plurality of two parallel vertical members being pivotally and slidably attached to said plurality of two parallel L-shaped horizontal members;

a plurality of two support cross members, said plurality of two support cross members being pivotally attached one each to one each of said plurality of two parallel L-shaped horizontal members and releasably attachable to the other of said plurality of two parallel L-shaped horizontal members;

said plurality of two support cross members having a plurality of two first ends and a plurality of two second ends, with each of said plurality of two support cross members having a first end and a second end;

said first ends of each of said plurality of two support cross members being pivotally attached to said horizontal portion of one of said plurality of two parallel L-shaped horizontal members;

said second ends of each of said plurality of two support cross members being releasably attached to said horizontal portion of the other of said plurality of two parallel L-shaped horizontal members such that when said plurality of two support cross members are each pivoted and positioned perpendicular to said parallel L-shaped horizontal member to which said plurality of two support cross members are pivotally attached and releasably attached to said parallel L-shaped horizontal member to which said plurality of two support cross members are releasably attached, said plurality of two support cross members secure said plurality of two parallel L-shaped horizontal members in a generally rectangular framework manner to support said plurality of two parallel vertical members in upright parallel position;

said plurality of two parallel vertical members having a plurality of two bottom ends and a plurality of two top ends with each of said plurality of two parallel vertical members having a top end and a bottom end;

said plurality of two parallel L-shaped horizontal members having a plurality of two front ends and a plurality of two rear ends, with each of said plurality of two parallel L-shaped horizontal members having a front end, a rear end, a horizontal portion and a vertical portion;

said plurality of two bottom ends of said plurality of two parallel vertical members being pivotally and slidably attached to said vertical portions of said plurality of two front ends of said plurality of two parallel L-shaped horizontal members;

said vertical portions of said plurality of two front ends of said plurality of two parallel L-shaped horizontal members having a plurality of two pins, said plurality of two pins being one each on one each of said vertical portions of said plurality of two front ends of said plurality of two parallel L-shaped horizontal members;

said plurality of two bottom ends of said plurality of two parallel vertical members having a plurality of two slots, said plurality of two slots being one each on one each of said plurality of two bottom ends of said plurality of two parallel vertical members;

said plurality of two pins on said vertical portions of said plurality of two parallel L-shaped horizontal members extending through said plurality of two slots of said plurality of two bottom ends of said plurality of two vertical members;

said plurality of two parallel vertical members pivoting and sliding on said plurality of two pins on said vertical portions of said plurality of two parallel L-shaped horizontal members 90 degrees or perpendicular to said plurality of two parallel L-shaped horizontal members;

said horizontal portions of said plurality of two bottom ends of said plurality of two parallel L-shaped horizontal members having a plurality of two slots;

said plurality of two bottom ends of said plurality of two parallel vertical members sliding into said plurality of two slots in said horizontal portion of said plurality of two parallel L-shaped horizontal members when said plurality of two parallel vertical members are pivoted 90 degrees or perpendicular to said plurality of two parallel L-shaped horizontal members;

said plurality of two bottom ends of said plurality of two parallel vertical members securing said plurality of two parallel vertical members 90 degrees or perpendicular to said plurality of two parallel L-shaped horizontal members;

a plurality of two flexible cords, said plurality of two flexible cords attaching said plurality of two parallel vertical members to said plurality of two parallel L-shaped horizontal members, said plurality of two flexible cords attaching one each to one each of said plurality of two top ends of said plurality of two parallel vertical members and one each to one each of said vertical portions of said rear ends of said plurality of two parallel L-shaped horizontal members;

said aquatic seine device having a flexible net;

said flexible net being capable of allowing running water to pass therethrough yet adapted to retain aquatic insects, nymphs or other organisms being carried by said running water passing through said flexible net; and, said flexible net being capable of being secured to said plurality of two parallel vertical members.

2. A portable aquatic seine device as set forth in claim 1 wherein said flexible net further comprises said flexible net having at least two compartments vertically.

* * * * *